March 31, 1970 L. J. BISHOP 3,503,335
TOW TRUCK CONVEYOR SYSTEM
Filed Sept. 28, 1967 7 Sheets-Sheet 3

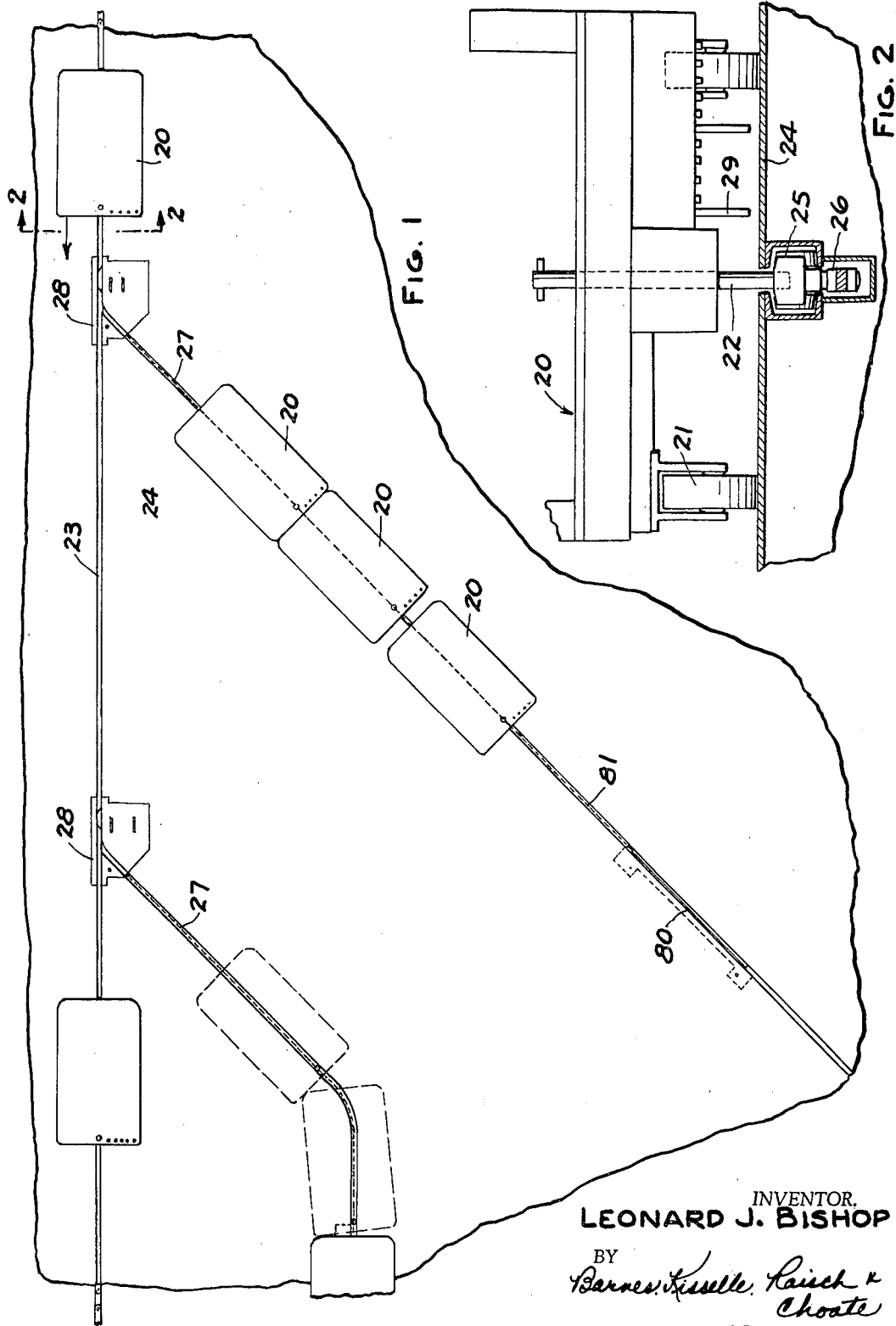

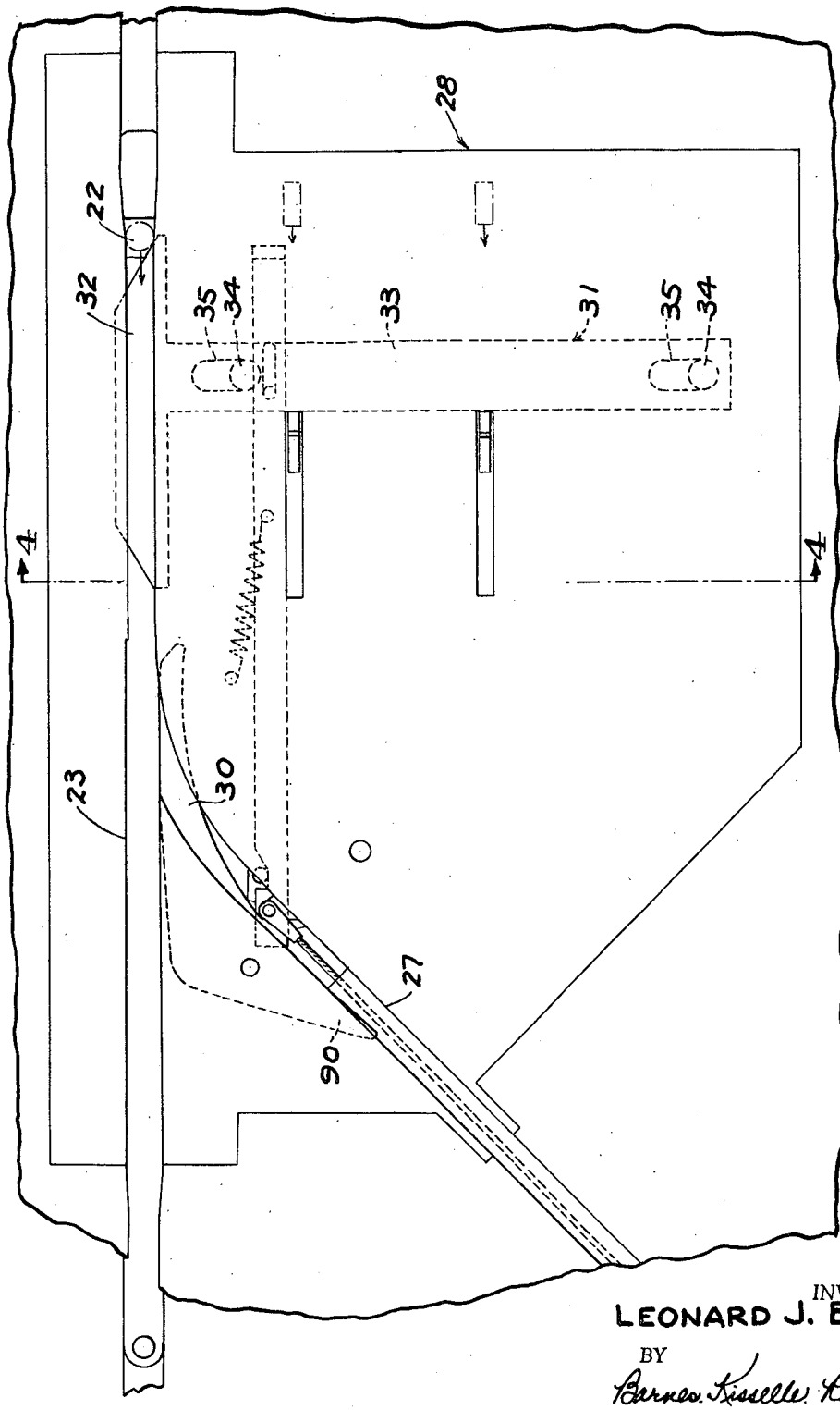

INVENTOR.
LEONARD J. BISHOP
BY
Barnes, Kisselle, Raisch & Choate
ATTORNEYS

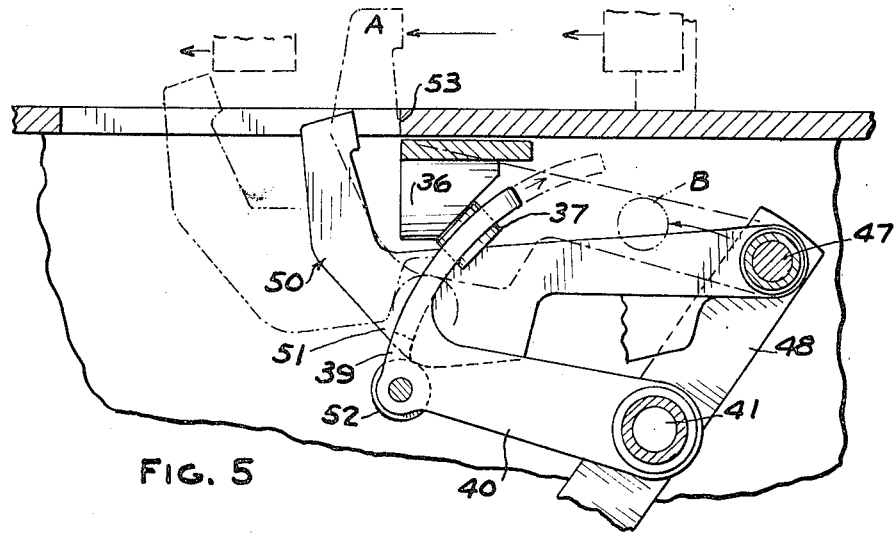

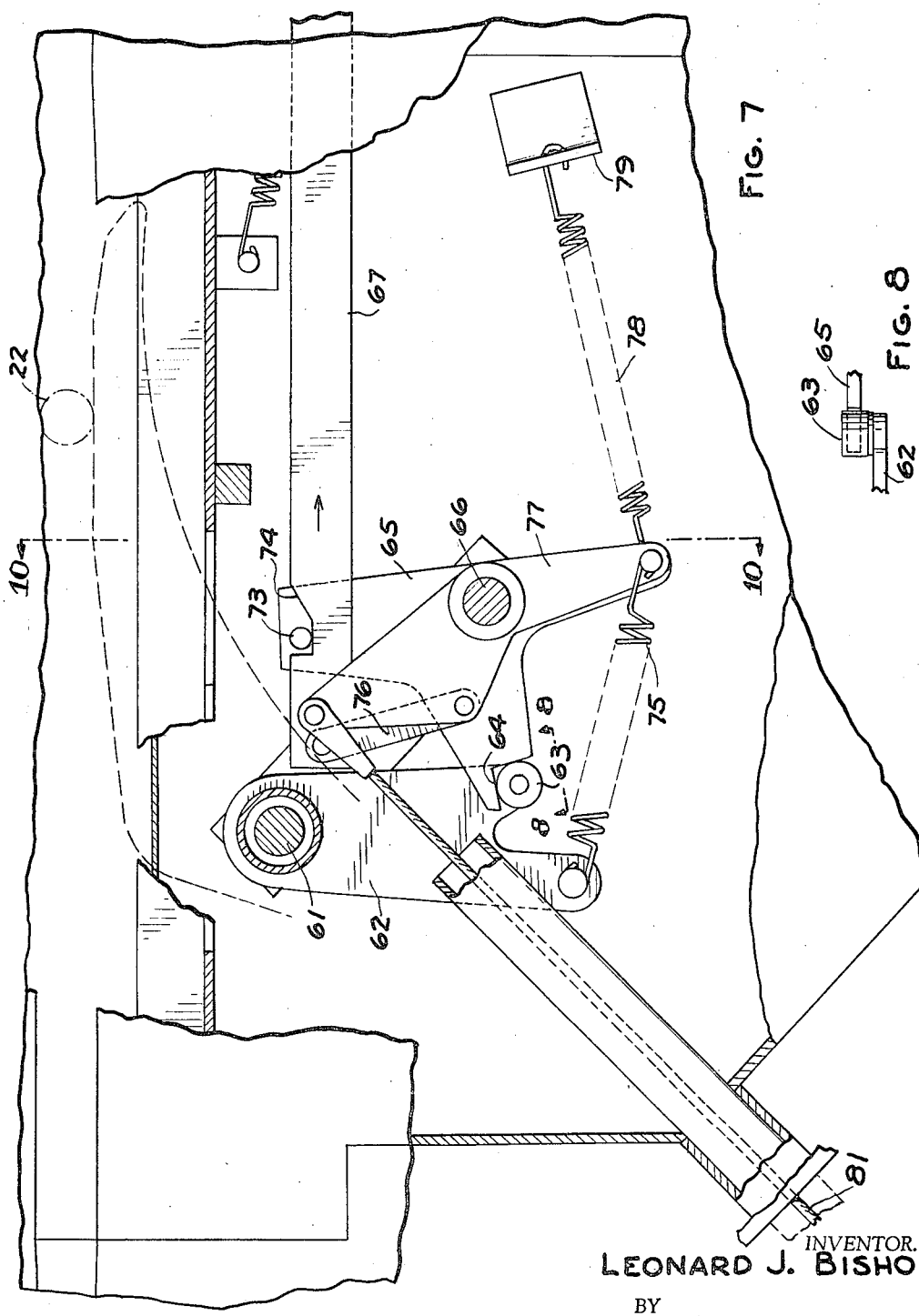

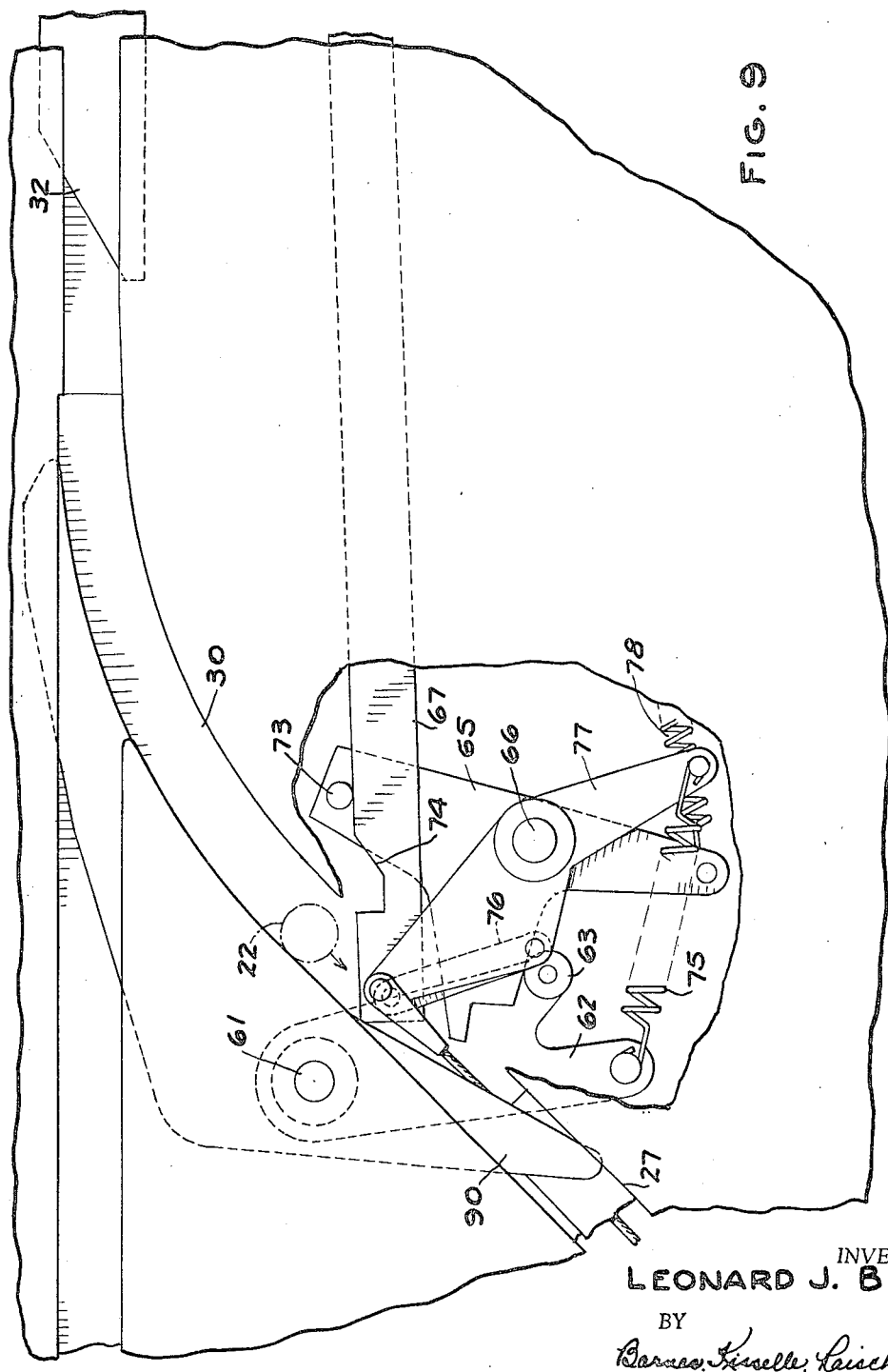

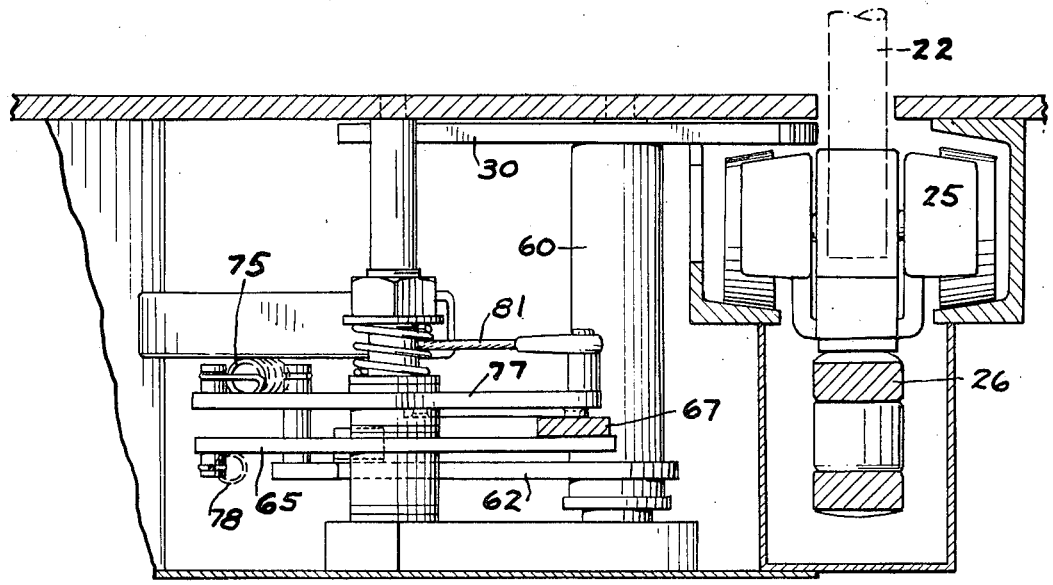
FIG. 10
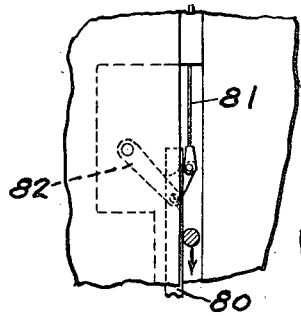
FIG. 12
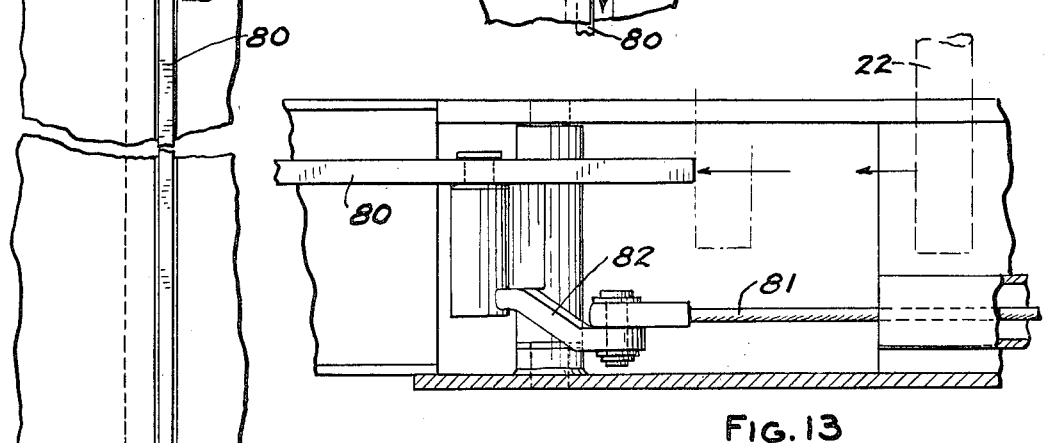
FIG. 11
FIG. 13
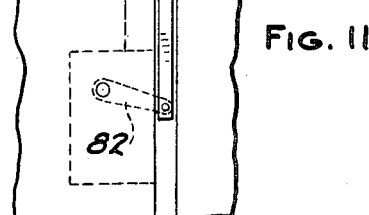

United States Patent Office 3,503,335
Patented Mar. 31, 1970

3,503,335
TOW TRUCK CONVEYOR SYSTEM
Leonard J. Bishop, Bloomfield Hills, Mich., assignor, by mesne assignments, to American Chain & Cable Company, Inc., New York, N.Y., a corporation of New York
Filed Sept. 28, 1967, Ser. No. 671,276
Int. Cl. B61k *1/00;* B61j *3/06*
U.S. Cl. 104—88        31 Claims

ABSTRACT OF THE DISCLOSURE

A tow truck conveyor system comprises a plurality of tow trucks, each of which has a downwardly extending tow pin and a plurality of signal members selectively mounted thereon. A cam bar is engaged by a tow pin as it moves along a main slot and swings a cam that engages a first signal reader and moves it upwardly into the path of a signal member on the tow truck. If the tow truck is carrying properly located signal members, the first signal member engages the first signal reader to cause a second signal reader to move upwardly into the path of a second signal member on the truck. The two signal members then cause the switch tongue to be moved for diverting the tow pin.

This invention relates to a tow truck conveyor system.

BACKGROUND OF THE INVENTION

In the handling of tow trucks having tow pins that extend downwardly into a main slot and are moved along the main slot by a main conveyor that engages the tow pins, it is common to provide means for diverting the tow truck into branch slots upon signal. It has heretofore been suggested that the signal reader be moved upwardly into the path of signal members on the tow truck upon approach of the tow truck toward the switching zone. Such an apparatus is disclosed and claimed in the patent to Klamp 3,127,849, issued Apr. 7, 1964. By this arrangement, the signal reader is not normally in position above the surface of the floor so that the damage to the signal reader is prevented. It has also been heretofore common to provide two or more signal readers so that a greater combination of signal members can be provided on the tow truck.

Among the objects of the present invention are to provide a tow truck conveyor system wherein two or more signal readers are utilized which are not normally above the floor but are movable into signal position only on the approach of a tow truck and wherein both signal readers must be engaged by signal members on the tow truck in order to actuate the mechanism for switching the tow truck into the branch slot; wherein the system is relatively simple, compact, easy to maintain and reliable.

SUMMARY

The tow truck conveyor system disclosed herein comprises a plurality of tow trucks, each of which has a downwardly extending tow pin and a plurality of signal members selectively mounted thereon. Each tow pin is adapted to extend downwardly through a main slot in the floor. One or more branch slots are provided along the main slot into which the tow pins of the tow trucks are adapted to be selectively guided. A main conveyor engages each tow pin and moves each tow truck along the main slot. An exit switch is associated with each area of juncture between the main slot and a branch slot and comprises a switch tongue that is movable from a position out of the path of a tow pin along the main slot to a position where it engages and guides the tow pin into the branch slot. A cam bar is engaged by a tow pin as it moves along the main slot toward the area of juncture of the branch slot and when engaged thereby, swings a cam that engages a first signal reader and moves it upwardly into the path of a signal member on the tow truck. If the tow truck is carrying a properly located signal member, the signal member engages the first signal reader and moves the signal reader to cause a second signal reader to move upwardly into the path of the signal members on the truck. If the second signal reader is properly located relative to the truck, it is engaged by a second signal member on the tow truck and is moved and thereby causes a latch which is holding the switch tongue to become released and thereby move the switch tongue to a position for diverting the tow pin into the branch slot. If another tow truck is present in the branch slot and there is no further room for an additional tow truck, means are provided for preventing the switching.

DESCRIPTION OF THE DRAWINGS

FIG. 1 is a partly diagrammatic plan view of a tow truck conveyor system embodying the invention.

FIG. 2 is a fragmentary sectional view taken along the line 2—2 in FIG. 1.

FIG. 3 is a fragmentary plan view of the portion of the system shown in FIG. 1 on an enlarged scale.

FIG. 5 is a fragmentary sectional view taken along the line 5—5 in FIG. 4.

FIG. 6 is a fragmentary sectional view taken along the line 6—6 in FIG. 4.

FIG. 7 is a fragmentary part sectional view on an enlarged scale of a portion of the system shown in FIG. 3.

FIG. 8 is a fragmentary sectional view taken along the line 8—8 in FIG. 7.

FIG. 9 is a fragmentary view similar to FIG. 7 showing the parts in a different operative position.

FIG. 10 is a fragmentary sectional view taken along the line 10—10 in FIG. 7.

FIG. 11 is a fragmentary sectional view of a portion of the system shown in FIG. 1.

FIG. 12 is a fragmentary view similar to FIG. 11 showing the parts in a different operative position.

FIG. 13 is a fragmentary sectional view on an enlarged scale taken along the line 13—13 in FIG. 11.

DESCRIPTION

Figure 4:
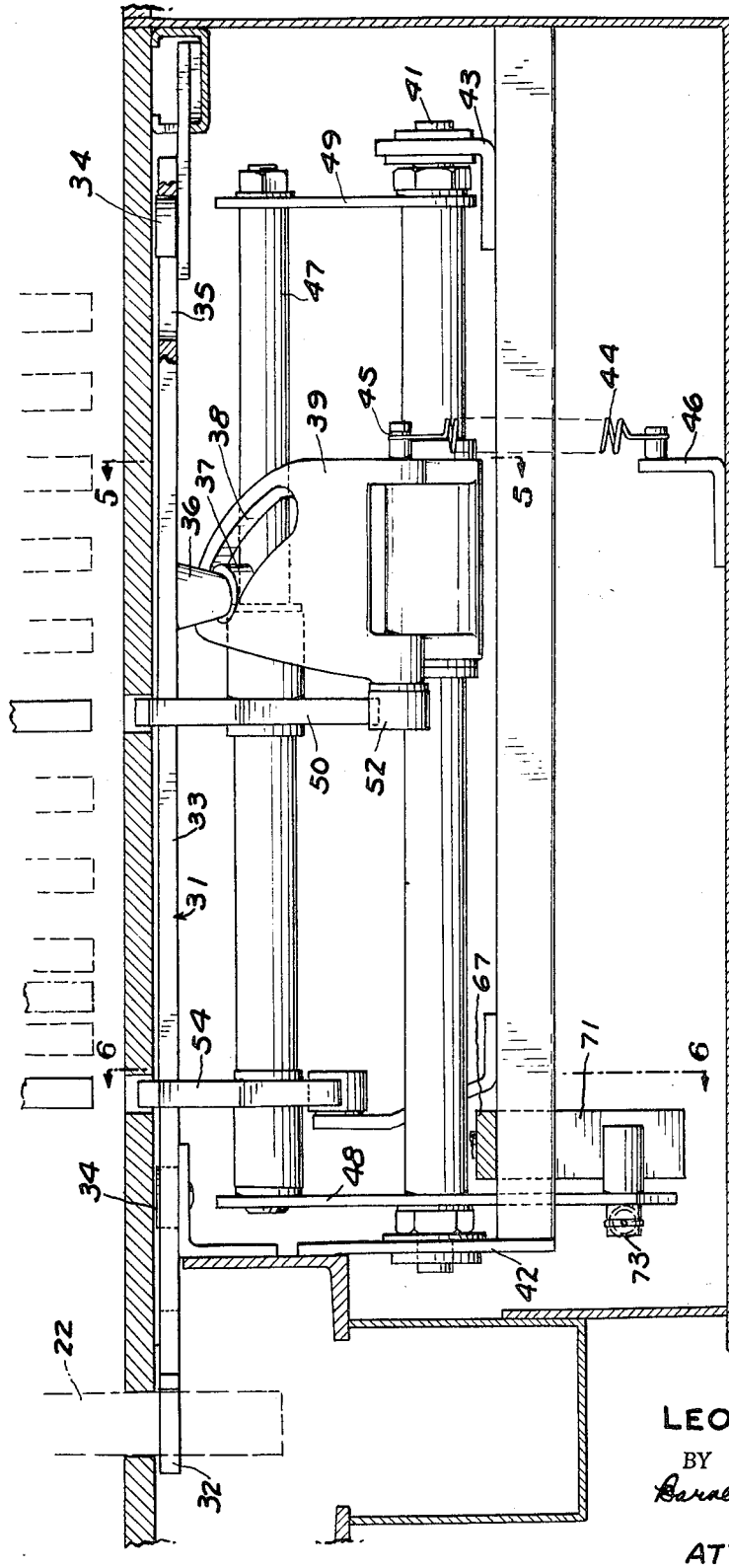
FIG. 4 is a fragmentary sectional view on an enlarged scale taken along the line 4—4 in FIG. 3.

Referring to FIG. 1, the tow truck conveyor system embodying the invention comprises a plurality of tow trucks 20 each of which has wheels 21 thereon and a downwardly extending tow pin 22 that extends through a main slot 23 in the floor 24 for engagement with a dog 25 of a main conveyor chain 26. Branch slots 27 are provided at desired points along the floor and an exit switch 28 at each branch slot is adapted to selectively guide the tow pin 22 of the tow trucks into the branch slot upon signal. Specifically, each tow truck 20 has selectively positionable signal members 29 that are adapted to engage signal readers of the exit switches to control a switch tongue, as presently described, which will guide the tow pin into the branch slot.

Referring to FIGS. 3 and 4, each exit switch 28 comprises a switch tongue 30 that is movable from a position as shown to a position wherein it is engaged by the tow pin to guide the tow pin into the branch slot 27. As shown in FIGS. 3 and 4, a cam bar 31 is mounted for reciprocating movement in a direction transverse to the slot 23. Cam bar 31 is T-shaped and has a short arm 32 that projects into the path of the tow pin 22 and is adapted to be engaged thereby and cammed out of the slot 23. The cam bar also includes a long arm 33 that is supported by rollers 34 extending into slots 35 which guide the reciprocating movement of the cam bar. Cam bar 31 has a downwardly extending projection 36 on which a roller 37 is mounted and extends into a slot 38 of a cam 39.

As shown in FIGS. 4 and 5, cam 39 comprises an arcuate plate that is fixed upon arm 40 mounted for swinging movement on a shaft 41 that, in turn, is fixed to brackets 42, 43. A spring 44 has one end thereof connected at 45 to the cam 39 and the other end thereof connected to a bracket 46 so that the cam 39 normally urges the roller 37 to the upper end of the slot 38 and, in turn, urges the short arm 32 of the cam bar 31 into the path of the tow pin 22.

A shaft 47 is mounted between levers 48, 49 that are pivoted to the shaft 41. A first signal reader 50 is mounted for swinging movement on the shaft 47. First signal reader 50 has a portion 51 thereof that engages a roller 52 on the cam 39. When the tow pin 22 of an approaching tow truck engages the short arm 32 of the cam bar 33, the cam bar is moved to the right as viewed in FIG. 2 and swings the cam 39 clockwise as viewed in FIG. 5 causing the roller 52 to cam the signal reader 50 upwardly through a slot 53 in the floor to position A, as viewed in FIG. 5, into the path of the tow truck.

A second signal reader 54 is mounted on the shaft 47 for swinging movement and has the undersurface thereof engaging a roller 55 that is mounted on a fixed bracket 56. If the first signal reader 50 is engaged by a signal member on the tow truck after the signal reader has been moved to position A, the signal reader will be swung in a counterclockwise fashion as viewed in FIG. 5 and, in turn, swing the levers 48, 49 bringing the shaft 47 to position B as viewed in FIG. 5. At the same time, because of the configuration of the underside of the second reader 54, the roller 55 will cam the second signal reader 54 upwardly through an opening 57 in the floor to position C as viewed in FIG. 6. If another signal member on the tow truck is properly positioned, it will engage the second signal reader 54 when it is in position C carrying it forwardly and downwardly as shown in broken lines in FIG. 6 swinging the lever 47 to position D. This produces the necessary motion for actuating the switch tongue 30 as presently described.

Referring to FIGS. 7 and 10, the switch tongue 30 is fixed on a tube 60 which is rotatably mounted on a shaft 61. A latch arm 62 is fixed to the lower end of the tube and has a roller 63 thereon that is adapted to be engaged by the notch 64 of a latch 65 pivoted on a shaft 66. In the position shown in FIG. 7, the latch engages the roller 63 and holds the switch tongue in position out of the path of the tow pin 22. A latch release bar 67 has one end thereof guided for reciprocating movement by a pin 68 thereon that extends upwardly into a slot 69 of a fixed bracket 70 (FIG. 6). One end of the bar 67 is bent downwardly as at 71 into the path of a pin 72 on the lever 48. A spring 73 has one end thereof normally connected to the lever 48 and the other end thereof to a fixed point so that the lever 48 is yieldingly urged to the solid line position as shown in FIGS. 5 and 6. When the first and second signal readers 50, 54 are successively engaged by signal members on the tow truck, the latch release bar 67 is translated to the broken line position as viewed in FIG. 6.

As shown in FIG. 7, a pin 73 on latch 65 extends into a notch 74 on the latch bar 67 so that when the latch bar 67 is translated to the right as viewed in FIG. 7, the notch engages the pin 73 swinging the latch 65 clockwise to release the latch 65 from the switch tongue arm permitting a spring 75 to swing the switch tongue 30 into position for diverting the tow pin 22.

As shown in FIGS. 7 and 10, the end of latch bar 67 adjacent the latch 65 is pivotally interconnected thereto by a link 76. One end of the link is pivoted to the bar 67 and the other end is pivoted to a choke lever 77 rotatably mounted on the shaft 66. Spring 75 has one end thereof connected to the switch tongue arm 62 and the other end thereof connected to the choke lever 77. Another spring 78 has one end thereof connected to a fixed bracket 79 and the other end thereof connected to the latch 65 and yieldingly urging the latch in a counterclockwise direction as viewed in FIG. 7.

In order to prevent switching of a tow truck into a branch slot 27 if more than a predetermined number of tow trucks have already been switched into the branch line, a choke control is adapted to operate the choke lever 77 and prevent operation of the switch tongue. Specifically, as viewed in FIG. 1, a bar 80 is provided along the branch slot 27 and is adapted to be engaged by a tow pin. When the bar 80 is engaged, it pulls a cable 81 connected thereto to draw the cable 81 in a direction to swing the choke lever 77 counterclockwise as viewed in FIG. 7. This pulls the left end of latch bar 67 downwardly out of engagement with the pin 73 so that any reciprocation of the latch bar 67 will not cause disengagement of the latch 65.

Specifically, as shown in FIGS. 11–13, the choke bar 80 is mounted by parallel arms 82 for swinging movement into and out of the path of the tow pin. One end of the cable 81 is connected to the one arm 82 and extends to the choke lever 77.

OPERATION

Referring to FIG. 1, as a tow truck 20 approaches one of the switches 28, the tow pin 22 engages the cam bar 31 to move the cam bar 31 transversely against the action of the spring 44. This swings the cam 39 clockwise as viewed in FIG. 5 causing the roller 52 to swing the first signal reader 50 upwardly to position A. If a signal member 29 is properly positioned on the tow truck, it engages the first signal reader 50 moving the signal reader forwardly and carrying the shaft 47 and lever 48 to position B. This swinging movement causes the second signal reader 54 to move upwardly to position C (FIG. 6) because of the engagement with the roller 55. If a second signal member 29 on the tow truck is properly positioned, it engages the second signal reader 54 moving the signal reader 54 to the broken line position shown in FIG. 6 and swinging the shaft 47 and, in turn, the lever 48 to position D. This causes the pin 72 on the lever 48 to engage the latch bar 67 and move it to the right as viewed in FIGS. 3, 6 and 7. This movement causes the notch 74 to engage the pin 73 and swing the latch 65 clockwise as viewed in FIG. 7 to disengage the notch 64. from the roller 63 permitting the spring 75 to swing the switch tongue into position for diverting a tow pin 22. As the tow truck is diverted into the branch slot, the tow pin engages one end 90 of the switch tongue 30 to swing the switch tongue back into position for engagement by the latch 65.

As soon as the tow pin of the tow truck has left the cam bar 31, the cam 39 will have moved downwardly lowering the first signal reader 50. As soon as the latch bar 67 has released the latch and the signal member on the tow truck has passed the second signal reader 74, the spring 73 will return the lever 48 to its original position.

In the event that a tow truck has reached the tow bar 80, the cable 81 will have moved the choke lever 77 swinging the latch bar to the position shown in FIG. 9 so that any reciprocating movement thereof will not disengage the latch.

I claim:

1. In a tow truck conveyor system, the combination comprising a plurality of tow trucks, each said tow truck having a downwardly extending tow pin, a floor having a main slot into which the tow pins of said tow truck are adapted to extend, a main conveyor along said main slot, said floor having a branch slot converging with said main slot, each said tow truck having at least two signal members selectively positioned thereon, and an exit switch associated with the area of juncture of said main slot and said branch slot, said exit switch comprising a first signal reader movable from a position beneath said floor to a position above said floor into the path of a tow truck, means engageable by the tow pin of an oncoming tow truck moving along said main slot toward said area of juncture of said main slot and said branch slot for elevating said first signal reader above the floor, a second signal reader movable from a position beneath said floor to a position above said floor into the path of a tow truck, means responsive to the engagement of said first signal reader by a signal member on a tow truck to elevate said second signal reader above the floor, diverting means at the area of juncture of said main slot and said branch slot for selectively engaging said tow pin and guiding said tow pin into said branch slot, and means responsive to the engagement of said second reader by a signal member on said tow truck which has engaged said first reader for actuating said last mentioned means to guide said tow pin into said branch slot.

2. The combination set forth in claim 1 wherein said means engaged by said tow pin comprises a cam bar mounted for movement transversely into and out of the path of said tow pin along said main slot.

3. The combination set forth in claim 2 wherein said means engaged by said tow pin includes a cam mounted for swinging movement about an axis parallel to the movement of said cam bar, interengaging means between said cam and said cam bar for swinging said cam in response to translation of said cam bar, said swinging movement adapted to move said first signal reader upwardly above the floor into the path of a signal member on said tow truck.

4. The combination set forth in claim 3 wherein said interengaging means comprises a cam slot in said cam and a cam follower on said cam bar.

5. The combination set forth in claim 3 wherein said first signal reader is mounted for swinging movement about an axis parallel to the axis of movement of said cam bar.

6. The combination set forth in claim 5 wherein said cam and first signal reader have interengaging surfaces whereby upon swinging movement of said cam said first signal reader is swung upwardly above the floor.

7. The combination set forth in claim 3 wherein said second signal reader is mounted for swinging movement about an axis parallel to the axis of said cam, said second signal reader having a cam surface engageable by a fixed cam whereby when a tow pin on the tow truck engages said first signal reader and swings said first signal reader about the axis of said cam said second signal reader is cammed upwardly by said fixed cam above the floor.

8. The combination set forth in claim 1 wherein said means responsive to the engagement of said second signal reader by a signal member on the tow truck comprises a bar actuated by the bodily movement of said second signal reader, a latch engaging said diverting means, and means interengaging said bar and said latch for swinging said latch out of holding position to permit said diverting means to be moved into the path of said tow pin.

9. The combination set forth in claim 8 wherein said interengaging means comprises a pin on said latch and a notch on said bar.

10. The combination set forth in claim 9 including means responsive to the presence of a tow truck along the branch slot for moving said latch bar out of engagement with said pin whereby upon movement of said latch bar in response to engagement of said second signal reader, said latch will not be operated.

11. In a tow truck conveyor system, the combination comprising a plurality of tow trucks, each said tow truck having a downwardly extending tow pin, said floor having a main slot into which the two pins of said tow truck are adapted to extend, a main conveyor along said main slot, said floor having a branch slot converging with said main slot, each said tow truck having at least two signal members selectively positioned thereon, and an exit switch associated with the area of juncture of said main slot and said branch slot, said exit switch comprising a switch tongue mounted for movement at the area of juncture between the main slot and branch slot from a nondiverting position wherein said tow pin may move uninterruptedly past said branch slot to a diverting position wherein said tow pin engages said switch tongue and is cammed into said branch slot, a cam bar having a portion thereof normally projecting into the path of the tow pin as it moves along said main slot toward the area of juncture of said main slot and branch slot, a cam mounted for swinging movement about a first axis, said cam bar and cam having interengaging means, a shaft mounted for swinging movement about said axis, a first signal reader mounted for swinging movement on said shaft, a second signal reader mounted for swinging movement on said shaft, said cam having a portion thereof adapted to engage said first signal reader and swing said first signal reader upwardly above said floor when said cam bar is engaged by a tow pin and swings said cam, a fixed cam follower, said second signal reader having a portion thereof engaging said first cam follower and adapted to swing said second signal reader above said floor when said first signal reader is engaged by a tow pin and thereby causes said shaft to swing about said first axis, a latch holding said switch tongue in nondiverting position, and means responsive to the swinging movement of said shaft when a signal member on said tow truck engages said second signal reader to disengage said latch and move said switch tongue to diverting position.

12. The combination set forth in claim 11 wherein said interengaging means between said cam and said cam bar comprises a slot in said cam and a follower on said cam bar.

13. The combination set forth in claim 11 wherein said means responsive to the swinging movement of said shaft for disengaging said latch comprises a latch bar adapted to be reciprocated by said swinging movement, interengaging means between said latch bar and said latch.

14. The combination set forth in claim 13 wherein said last mentioned means comprises a pin on said latch and a slot on said latch bar.

15. The combination set forth in claim 14 including means responsive to the presence of a tow truck along said branch slot for swinging said latch bar out of engagement with said pin whereby when said latch bar is reciprocated, said latch remains in latching position.

16. The combination set forth in claim 11 wherein one of said signal readers is mounted on one side of said main slot and the other of said signal readers is mounted on an opposite side of said main slot.

17. For use in a tow truck conveyor system comprising a plurality of tow trucks, each said tow truck having a downwardly extending tow pin, a floor having a main slot into which the tow pins of said tow truck are adapted to extend and a branch slot converging with said main slot, a main conveyor along said main slot, and wherein each said tow truck having at least two signal members selectively positioned thereon, the improvement in an exit switch associated with the area of juncture of said main slot and said branch slot comprising
   a first signal reader movable from a position beneath a floor to a position above said floor into the path of a tow truck,
   means adapted to be engaged by the tow pin of an oncoming tow truck moving along said main slot toward said area of juncture of said main slot and said branch slot for elevating said first signal reader above the floor,
   a second signal reader movable from a position beneath a floor to a position above said floor into the path of a tow truck,
   means responsive to the engagement of said first signal reader by a signal member on a tow truck to elevate said second signal reader above the floor,
   diverting means adapted to be placed at the area of juncture of said main slot and said branch slot for selectively engaging said tow pin and guiding said tow pin into said branch slot, and
   means responsive to the engagement of said second reader by a signal member on said tow truck which has engaged said first reader for actuating said last mentioned means to guide said tow pin into said branch slot.

18. The combination set forth in claim 17 wherein said means engaged by said tow pin comprises a cam bar adapted to be mounted for movement transversely into and out of the path of a tow pin along said main slot.

19. The combination set forth in claim 18 wherein said means adapted to be engaged by said tow pin includes a cam mounted for swinging movement about an axis parallel to the movement of said cam bar, interengaging means between said cam and said cam bar for swinging said cam in response to translation of said cam bar, said swinging movement adapted to move said first signal member upwardly above the floor into the path of a signal member on said tow truck.

20. The combination set forth in claim 19 wherein said interengaging means comprises a cam slot in said cam and a cam follower on said cam bar.

21. The combination set forth in claim 20 wherein said first signal reader is mounted for swinging movement about an axis parallel to the axis of movement of said cam bar.

22. The combination set forth in claim 21 wherein said cam and first signal reader have interengaging surfaces whereby upon swinging movement of said cam said first signal reader is swung upwardly above the floor.

23. The combination set forth in claim 22 wherein said second signal reader is mounted for swinging movement about an axis parallel to the axis of said cam, said second signal reader having a cam surface engageable by a fixed cam wherein when a tow pin on a tow truck engages said first signal reader and swings said first signal reader about the axis of said cam said second signal reader is cammed upwardly by said fixed cam above the floor.

24. The combination set forth in claim 23 wherein said means responsive to the engagement of said second signal reader by a signal member on a tow truck comprises a bar actuated by the bodily movement of said second signal reader, a latch engaging said diverting means, and means interengaging said bar and said latch for swinging said latch out of holding position to permit said diverting means to be moved into the path of said tow pin.

25. The combination set forth in claim 24 wherein said interengaging means comprises a pin on said latch and a notch on said bar.

26. The combination set forth in claim 25 including means responsive to the presence of a tow truck along the branch slot for moving said latch bar out of engagement with said pin whereby upon movement of said latch bar in response to engagement of said second signal reader, said latch will not be operated.

27. For use in a tow truck conveyor system comprising a plurality of tow trucks, each said tow truck having a downwardly extending tow pin, a floor having a main slot into which the tow pins of said tow truck are adapted to extend and a branch slot converging with said main slot, a main conveyor along said main slot, and wherein each said tow truck having at least two signal members selectively positioned thereon, the improvement in an exit switch associated with the area of juncture of said main slot and said branch slot comprising
   a switch tongue adapted to be mounted for movement at the area of juncture between the main slot and branch slot from a non-diverting position wherein said tow pin may move uninterruptedly past said branch slot to a diverting position wherein said tow pin engages said switch tongue and is cammed into said branch slot,
   a cam bar having a portion thereof normally adapted to project into the path of the tow pin as it moves along said main slot toward the area of juncture of said main slot and branch slot,
   a cam mounted for swinging movement about a first axis,
   said cam bar and cam having interengaging means,
   a shaft mounted for swinging movement about said axis,
   a first signal reader mounted for swinging movement on said shaft,
   a second signal reader mounted for swinging movement on said shaft,
   said cam having a portion thereof adapted to engage said first signal reader and swing said first signal reader upwardly above said floor when said cam bar is engaged by a tow pin and swings said cam,
   a fixed cam follower,
   said second signal reader having a portion thereof engaging said first cam follower and adapted to swing said second signal reader above said floor when said first signal reader is engaged by a tow pin and thereby causes said shaft to swing about said first axis,
   a latch holding said switch tongue in non-diverting position and means responsive to the swinging movement of said shaft when a signal member on said tow truck engages said second signal reader to disengage said latch and move said switch tongue to diverting position.

28. The combination set forth in claim 27 wherein said interengaging means between said cam and said cam bar comprises a slot in said cam and a follower on said cam bar.

29. The combination set forth in claim 28 wherein said means responsive to the swinging movement of said shaft for disengaging said latch comprises a latch bar adapted to be reciprocated by said swinging movement, interengaging means between said latch bar and said latch.

30. The combination set forth in claim 29 wherein said last-mentioned means comprises a pin on said latch and a slot on said latch bar.

31. The combination set forth in claim 27 including means adapted to be responsive to the presence of a tow truck along said branch slot for swinging said latch bar out of engagement with said pin whereby when said latch bar is reciprocated, said latch remains in latching position.

References Cited

UNITED STATES PATENTS

| | | | |
|---|---|---|---|
| 3,127,849 | 4/1964 | Klamp | 104—88 |
| 3,200,767 | 8/1965 | Klamp et al. | 104—88 |
| 3,343,498 | 9/1967 | Klamp | 104—88 |

TRYGVE M. BLIX, Primary Examiner